3,498,814
DISPERSIBLE CARBON BLACK BRIQUETTES
Andries Voet, Borger, Tex., and Gene William MacDonald, Akron, Ohio, assignors to J. M. Huber Corporation, Borger, Tex., a corporation of New Jersey
No Drawing. Continuation-in-part of application Ser. No. 350,566, Mar. 9, 1964. This application Aug. 1, 1967, Ser. No. 657,522
Int. Cl. C09c 1/58; C08d 7/00; C08h 17/08
U.S. Cl. 106—307                                    6 Claims

ABSTRACT OF THE DISCLOSURE

A compressed, shaped carbon black body suitable for dispersion in elastomers and having a bulk density of at least 38 pounds per cubic foot and a method of forming such a body by compressing carbon black pelleted with an oleaginous material.

---

This application is a continuation-in-part of our co-pending U.S. application Ser. No. 350,566 filed Mar. 9, 1964, entitled "Carbon Black" and now abandoned.

BACKGROUND OF THE INVENTION

Field of the invention

The invention relates to the conversion of fluffy carbon black into a dispersible compressed briquette suitable for shipping and dispersion into an elastomer.

DESCRIPTION OF THE PRIOR ART

Carbon black, as conventionally produced from thermal decomposition of hydrocarbons, has an apparent density of only three pounds per cubic foot. This so-called fluffy form of carbon black is easily dispersed in elastomers to produce reinforced products with desirable properties. Unfortunately, fluffy carbon blacks cannot be transported economically, nor can they be handled with automatic equipment in rubber processing plants.

The conventionally pelletized form of carbon black is used exclusively commercially in elastomers, in view of its higher density and resulting lower transportation cost, and its ability to be handled in automatic transport equipment, instead of bags. Moreover, the problem of dusting of fluffy carbon blacks is largely overcome in pelletized blacks.

For these reasons modern rubber processing plants cannot use fluffy carbon blacks, even though the fluffy blacks have superior reinforcing qualities to those of conventionally pelletized blacks.

It is possible to prepare carbon black pellets by thoroughly mixing fluffy carbon black with an oleaginous liquid comptatible with an elastomer and thereafter pelletizing the mixture in a dry process. Alternately, an oleaginous liquid was added in an emulsified form to a water-wetted paste of the fluffy carbon black followed by pelletization in a wet pelletizing process. Pelletized carbon blacks obtained in this manner retain the basic dispersing characteristics of the fluffy carbon black. The oleaginous films encompasing each carbon particle prevent the formation of the strong chemical bonds between carbon particles evident in conventionally pelletized blacks. Thus, these carbon blacks produce rubber vulcanizates with superior carbon black dispersion and a resulting superior reinforcing characteristic. This is discussed in more detail in U.S. Patent No. 3,282,719, wherein the inventor states as follows:

"In the prior art processes of pelletization of carbon black, strong chemical bonds between kinetic particle units are formed by means of a free-radical mechanism, as substantiated by physical measurements such as electron spin resonance as well as by direct chemical determination of free radicals, which all indicate a marked decrease of free radical concentration upon pelletization of the fluffy black. In the process of producing the pellets of my invention, these kinetic particle units are coated with an oleaginous material, and this coating was indirectly observed by electron micrography in which the effects of oily films around the smal particle clusters acting as kinetic units are clearly visible. In view of steric considerations, direct chemical bonding between the kinetic units is prevented by the films since the strongly absorbed films of oleaginous materials prevent close approach of the particles to one another. However, the character of the film promotes pelletization by physical interaction uniting physically bound particle clusters into pellets."

Fluffy blacks have bulk densities of about three pounds per cubic foot, while conventionally pelletized blacks have bulk densities varying from about 20 pounds per cubic foot for fine particle size blacks to densities as high as 35 pounds per cubic foot for coarse particle size blacks. The novel pellets with oleaginous films have bulk densities generally slightly less than those of conventional pellets of the same average particle size.

SUMMARY

The primary object of the present invention is to produce shaped densified bodies of carbon black pelleted with oleaginous materials with the bodies having bulk densities substantially higher than those of the corresponding pelletized blacks.

Another object of the invention is to provide shaped densified bodies of carbon black pelleted with oleaginous materials which are dust-free and have enough strength to permit efficient and convenient handling and transport.

A further object of the invention is to provide shaped densified bodies of the type described above which are readily dispersible into elastomers.

Other objects and advantages will become apparent in the following specification.

The invention is generally practiced by thoroughly and homogeneously mixing the fluffy carbon black with an oleaginous liquid compatible with elastomers. This mixture is thereafter first pelletized in a dry process and is thereafter densified, by compression, extrusion, molding or otherwise briquetting to the desired size, shape, density and strength.

It is very important that the bodies of the invention have enough strength to permit easy handling. If the concentration of oleaginous materials is too low, no amount of densification will cause the particles to stay together to form a firmly shaped body and the body will break or crumble on impact. If the oil concentration in the body is too high, the body will not maintain its shape when subjected to moderate pressures. Moreover, upon compression by the weight of the material itself, when stacked or packed in bags, individual bodies will stick together and form highly undesirable, larger, coalesced lumps. Consequently, there is a desirable range of concentration of oleaginous material to produce a suitable body. Obviously, the range of concentrations is dependent upon the characteristics of the oleaginous materials as well as of the black. The higher the oil absorption value of the type of black selected, the more oil can be tolerated for the upper limit of desirable concentration and the more oil will be needed to form a shaped densified body at the lower limit of oil concentration.

The application of somewhat elevated temperatures facilitates the formation of films of oleaginous materials on fluffy carbon black by permitting an easier and more rapid spreading of oleaginous material onto the black particle surfaces. However, care is to be taken that the temperature is low enough to prevent evaporation of the more volatile components of the oleaginous material. Particularly, it is essential that the temperature be kept substantially below the decomposition or charring temperature of the oleaginous material, since any charring or decomposition would destroy the basic properties of easy dispersibility of the densified bodies.

The oleaginous materials preferred in the practice of this invention and the term oleaginous as used in the specification and claims, refer to the elastomer compatible oil and oil like materials used in the compounding of elastomers. Such materials include high boiling petroleum oils and selected fractions of such petroleum oils. Particularly useful are cycloparaffinic and aromatic oils obtained from high boiling petroleum fractions by selective solvent extraction and known as rubber processing oils. Other suitable materials are fatty animal or vegetable oils. Oleic acid and fatty acids, such as lauric acid, stearic acid, and the like are satisfactory. While many of these acids are solids at room temperature, they act as oleaginous materials at temperatures above their melting point. Higher temperatures, even up to 300 degrees C. may be used in adding the oleaginous matter to the carbon blacks. Thus, the use of pitches and similar materials not fluid at room temperature is possible. For instance, pine tar is a suitable oleaginous material.

The quantity of oleaginous material to be added to the carbon black prior to pelleting in forming a shaped densified body is dependent on a number of factors. Obviously, however, the quantity cannot be less than the amount required to cover a substantial part of the carbon black particle surface with at least a monolayer of the oleaginous material.

A representative carbon black of the HAF type has a surface area of 75 m.$^2$ per gram. A suitable oleaginous material for use with this black is a naphthenic processing oil of a molecular weight of about 400 and a specific gravity of about 1.0. The volume of 1 mole of this oil is $4.0 \times 10^{26}$ A.$^3$ and the volume of 1 molecule is 670 A.$^3$. An orientated polar adsorption of the hydrocarbon chain would result in an area covered per molecule of about 20 A.$^2$, a value well established in the literature. However, the nonpolar oils generally will not form orientated films, but the molecules will be adsorbed in a more or less flat position on the surface of the carbon black. A simple calculation indicates that the area covered by one molecule of this oil in the flat position is about 150 A.$^2$. The number of oil molecules per m.$^2$ of carbon black is then $$\frac{1}{150} \times 10^{20}$$

Calculated per gram (75 m.$^2$), there would be $0.5 \times 10^{20}$ oil molecules, weighing 0.033 g. Consequently, to cover most of the surface of this black with a non-orientated monolayer of the described oil would require about 0.03 gram per gram of black, or about 3 percent by weight. For carbon blacks with larger surface areas, relatively more oil would be required to substantially cover the surface with a monolayer of oil. For oleaginous materials with different properties, such as, for instance, higher molecular weights, a higher percentage of oil would be required. In practice, however, it is desirable to have a somewhat larger quantity of oleaginous materials than the monolayer present. Nine parts of carbon black to one of oleaginous material by weight has been found to be very effective in producing bodies in accordance with the invention.

The maximum quantity of oleaginous materials tolerated by the carbon black without forming soft, mushy bodies is predominantly determined by the oil absorption value of the black. Generally, solid bodies can be obtained up to the point where the quantity of oleaginous materials does not surpass about 80% of the oil absorption value of the particular carbon black.

The pressure required to form compressed bodies is not critical; generally, pressures as low as 100 p.s.i. yield satisfactory bodies easily dispersed in elastomers. However, much higher pressures, such as 500 or 1000 p.s.i. can be used when higher densities are desired.

The size and shape of the densified body is not limited in any way. Structural bodies of 50 or 25 lbs. have been easily densified in large brick-like forms and cylindrical bodies have been prepared of varying diameter and length.

Smaller bodies have been extruded in spaghetti-like forms, which can be cut off at any desired length. Briquetting into spheroidal shapes and even tabletting has been done. The most advantageous form depends on the proposed use. Thus, large brick-like shapes are advantageously moved on pallets in box cars. Smaller cylindrical shapes are more easily handled by automatic equipment.

Characteristic of the usefulness of the densified bodies described is their unusually high density. Thus, for instance, conventional HAF pellets of normal structure usually have a density of 21–23 lbs./cu. ft. The bulk density of densified bodies described herein has been as low as 38 lbs./cu. ft. and as high as 80 lbs./cu. ft. Changes in the oleaginous material content and the bulk density do not materially change the excellent dispersibility quality of the densified bodies. The quantity of carbon black present per volume unit is considerably higher for the densified bodies than for the conventional pelletized materials, even in the presence of the oils. The conventionally pelletized black has generally a void volume as high as 80%. Fluffy black has a void volume as high as 97%. The added oleaginous material is taken up in the capillary voids of the fluffy black and the following pelletizing and further densification reduces the void volume considerably. Densification of the pellets formed with the oleaginous materials does not cause formation of hard, difficultly dispersible agglomerates in view of the presence of the oil films. In the absence of the oleaginous films, the agglomerates formed upon densification strongly resist redispersion and are generally unsuitable for use with elastomers after being subjected to higher pressures.

DESCRIPTION OF THE PREFERRED EMBODIMENTS

The following examples are illustrative only of the variety of carbonaceous oil concentrates, which can be made from available carbon blacks and oleaginous materials in different structural forms.

Example No. 1

Nine parts of a conventional fluffy ISAF black was mixed with one part of a rubber processing oil "Dutrex 726." The mixture was pelletized. Part of the pellets were compressed into cylindrical bodies of a diameter of 1 inch and a length of 3 inches in a suitable form at a pressure of 150 p.s.i. at 100 degrees C. The resulting densified bodies were firm and resisted crumbling or breaking, even upon being dropped on a concrete slab from a height of 3 feet.

The densified bodies as well as the uncompressed oil containing pellets were compared in a conventional SBR rubber recipe with conventionally pelletized ISAF black made from the same fluffy black sample. The finished compositions of the vulcanizates were identical.

The following table indicates the physical properties of the vulcanizates mixed in a laboratory Banbury mixer and cured for 60 minutes:

| Form of Black | 400% Modulus, p.s.i. | Tensile, p.s.i. | Hardness (Shore) | Rebound, 300° F. | Abrasion Resistance | Dispersion, percent | Bulk Density, lbs./cu. ft. |
|---|---|---|---|---|---|---|---|
| Densified bodies | 1,610 | 3,410 | 56 | 49.9 | 108.4 | 95 | 76 |
| Oil containing pellets | 1,630 | 3,390 | 57 | 50.1 | 109.4 | 96 | 22 |
| Conventional pellets | 1,490 | 3,300 | 56 | 49.7 | 100.0 | 89 | 24 |

The laboratory abrasion value was arbitrarily set at 100% for the conventional pellet. The degree of dispersion was measured with the aid of the conventional Leigh-Dugmore technique, by means of a microscopic study of frozen sections of the vulcanizate.

The results indicate that the densified body in reinforcing properties, is fully equivalent to the oil containing pellet and superior to conventional pellets in a conventional laboratory Banbury mix with SBR rubber. Yet, the density of the body is much higher and it contains much more carbon black per unit of volume notwithstanding the presence of the oleaginous material.

Example No. 2

The experiment of Example No. 1 was repeated, but 8 parts of black was mixed with 2 parts of "Dutrex 726" oil, followed by pelletization. The pellets were extruded into cylindrical units of 0.2 inch in diameter and cut off in lengths of about 0.5 inch. These bodies were strong and resisted breaking or crumbling. They were easily dispersed in a natural rubber in a laboratory Banbury mixer.

Example No. 3

The experiment of Example 1 was repeated, but instead of "Dutrex 726" a solution was used of 2 parts of pine tar in 8 parts of "Dutrex 726." The resulting mixture was pelletized at room temperature and compressed into cylindrical bodies 1 inch in diameter and 3 inches long. The cylindrical structural bodies were strong and remained intact after being dropped on a concrete slab from a height of 3 feet. Upon dispersion of the bodies in a laboratory Banbury mixer in SBR 1500, an excellent dispersion was obtained.

Example No. 4

Of a conventional HAF black, 9 parts were mixed in the fluffy form, with 1 part of a rubber processing oil of a naphthenic character marketed by Sun Oil Company as "Circosol 2XH." The mixture was pelletized and the pellets were compressed into cylindrical bodies of a diameter of 1 inch and a length of 3 inches in a suitable form at a pressure of 100 p.s.i. at room temperature. The resulting structural bodies were firm, resisted crumbling and breaking, even after being dropped on a concrete slab from a height of 3 feet. The structural bodies were easily dispersed in a laboratory Banbury mixer in neoprene rubber.

Example No. 5

The experiment of Example 4 was repeated, but 7 parts of the HAF black were mixed with 3 parts of the "Circosol 2XH" oil. The pelleted mixture was compressed at 200 p.s.i. into 4 inch cubes. The resulting shaped body had a bulk density of 57 lbs. per cubic foot. It was easily dispersed in a cispolybutadiene rubber by means of a laboratory Banbury mixer.

Example No. 6

The experiment of Example 4 was repeated, but 5 parts of the HAF black were mixed with 5 parts of an oil prepared by dissolving 2 parts of pine tar into 8 parts of "Circosol 2HX." The resulting mixture was pelletized and the pellets were extruded into cylindrical bodies of a diameter of 0.2 inch, cut into lengths of about 0.5 inch. These structural bodies were strong, but dispersed easily in natural rubber with the aid of a laboratory Banbury mixer.

Example No. 7

75 parts of a conventional GPF black were mixed in the fluffy form with 25 parts of a rubber processing oil of the aromatic type marketed by Shell Oil Company as "Dutrex 726." The mixture was pelletized and the pellets were pressed into briquettes, of a size about 3 x 3 x 2 inches, by means of a briquetting machine at 100 degrees C. The briquettes resisted crumbling or breaking, even after being dropped on a concrete slab from a height of 3 feet. The briquettes dispersed easily in SBR 1500 with the aid of a laboratory Banbury mixer.

The processing oil "Circosol 2XH" is manufactured by the Sun Oil Company and is a heavy, clear, transparent, viscous liquid having a pale green color. Composed of hydrocarbons of comparatively high molecular weight, derived entirely from selected crudes. Its composition may be regarded as relatively naphthenic. Specific gravity 0.9465; viscosity, SUS at 210° F., 85; aniline point, 175° F.; aromatics (percent by weight), 48.

The processing oil "Dutrex 726" is manufactured by Shell Oil Company and is heavy dark viscous liquid having a reddish brown color. Composed of hydrocarbons of comparatively high molecular weight derived from selected crude oil. Specific gravity 0.9895, viscosity SUS at 210° F., 83; aniline point 105° F., aromatics (percent by weight) 68.6.

It is sometimes desirable to manufacture shaped bodies from oil containing pellets which have a lower oil content than is desired in the shaped body. It is possible to manufacture such bodies by adding additional oil to the oil containing pelletized black. Obviously, the superior properties of the oil-containing pellets are not in any way affected by mixing them with additional quantities of oil prior to compression or extrusion into shaped bodies.

As set forth above, compressed bodies according to the invention may be formed from (A) fluffy carbon black pelletized with at least a monomolecular layer of oleaginous materials, separately coating the individual kinetic particle units of the carbon black, (B) carbon blacks pelletized with at least a monomolecular layer of oleaginous material separately coating the individual kinetic particle units of the carbon black and mixed with additional quantities of at least 1% of oleaginous material.

Having thus described the preferred embodiments of the invention it should be understood that numerous adaptations may be resorted to without departing from the scope of the appended claims.

We claim:

1. A shaped compressed carbon black body suitable for dispersion in and compounding with elastomers consisting of a plurality of carbon black pellets each consisting of a fluffy carbon black and an oleaginous pellet binding material with the individual kinetic particle units of the carbon black separately coated with at least a monomolecular film of the oleaginous pellet binding material, said body having a bulk density of at least 38 pounds per cubic foot and a bulk density value not higher than that value corresponding to a filling of the interparticle voids with said oleaginous pellet binding material to 80% by weight of the oil absorption value of the carbon black.

2. A shaped compressed carbon black body as claimed in claim 1 having in addition to the film of oleaginous material an additional quantity of at least 1% of oleaginous material.

3. A shaped compressed carbon black body as claimed in claim 1 in which the film of oleaginous material is at least 10% by weight of said body.

4. A process of producing a shaped carbon black body comprising the steps of mixing a fluffy carbon black with a quantity of an oleaginous material sufficient to form at least a monomolecular film on the individual kinetic particle units of the carbon black, pelletizing the mixture, and compressing a plurality of the pellets into a body under a pressure of at least 100 pounds per square inch to a bulk density of at least 38 pounds per cubic foot but less than that bulk density value corresponding to a filling of the interparticle voids with said oleaginous material to 80% by weight of the oil absorption value of the carbon black.

5. A process as claimed in claim 4 which includes the step of adding an additional quantity of at least 1% of oleaginous material to the pelleted mixture prior to compression into a body.

6. A process as claimed in claim 4 in which the film of oleaginous material is at least 10% by weight of said body.

References Cited

UNITED STATES PATENTS

| | | | |
|---|---|---|---|
| 2,167,674 | 8/1939 | Offutt | 106—307 |
| 2,384,236 | 9/1945 | Carlson | 23—314 |
| 2,500,968 | 3/1950 | Venuto | 23—314 |
| 2,518,211 | 8/1950 | Wiegand et al. | 23—314 |
| 2,607,435 | 8/1952 | Dohse | 23—314 |
| 2,682,686 | 7/1954 | Mrozowski | 23—314 |
| 3,258,355 | 6/1966 | Voet | 106—307 |
| 3,282,719 | 11/1966 | Voet | 106—307 |

JAMES E. POER, Primary Examiner

H. M. S. SNEED, Assistant Examiner

U.S. Cl. X.R.

23—314; 260—41.5, 763